United States Patent Office 3,393,452
Patented July 23, 1968

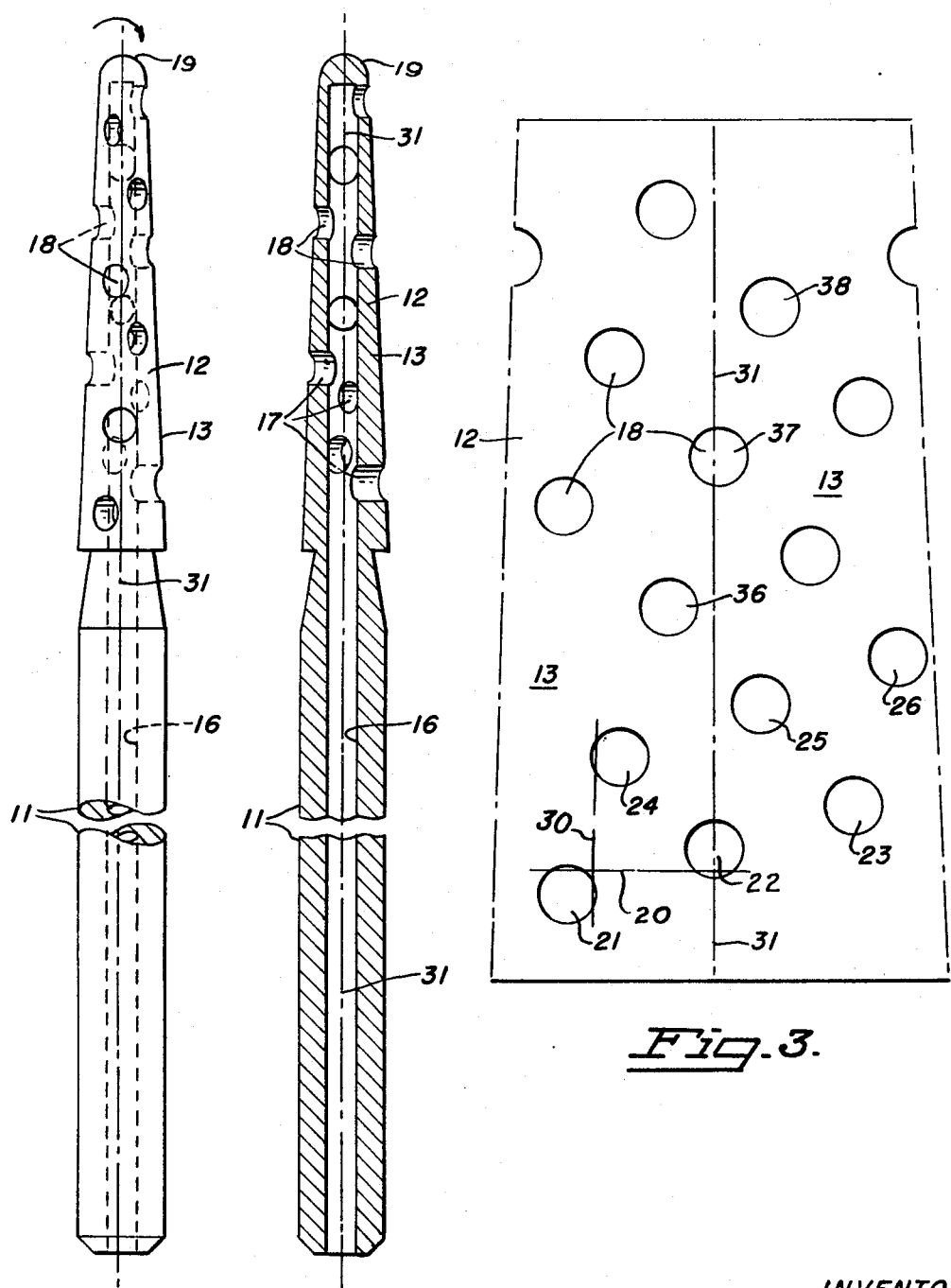

3,393,452
ROTARY DENTAL TOOL
Milton E. Nelson, 8466 Davona Drive,
San Ramon-Dublin, Calif. 94583
Filed Feb. 9, 1966, Ser. No. 526,276
4 Claims. (Cl. 32—48)

This invention relates generally to rotary dental tools, and, more particularly, relates to a rotary dental tool which employs a plurality of ports or openings for the emission of coolant material from the tool during rotation.

The use of perforated dental tools or drills having hollow shafts to allow the flow of coolant material axially to the drill head and from there radially to the working surface has become of even greater importance since the advent of high speed air turbine dental hand pieces. Perforated dental tools when employed in either the high speed or conventional hand pieces, however, have been found to have some distinct disadvantages. While such drills are much more effective in cooling the tooth surface being worked upon, they have been found to cause ridges or striations in the tooth surface adjacent the perforation openings. Moreover, these striations are not effectively eliminated by movement of the dental tool perpendicularly to the plane of rotation of the tool. Such movement either skews the ridges left by the tool or requires much more of the operator's time and skill to achieve a smooth and uniform surface.

High speed air turbine dental hand pieces present the additional problem of dynamic balance. Air turbine hand pieces are capable of driving standard drills at velocities as high as 200,000 to 400,000 r.p.m. At these spin rates any static or dynamic unbalance of the dental tool will be exaggerated, and interfere with the operator's skill, precision and dexterity in using the drill.

The dental drills to which the present invention relates are generally of a size of about 0.090 inch to 0.020 inch in diameter and are generally designated in the art as flames, torpedoes, straight cylinders, tapered cylinders and inverted cones. While other shapes and designations would fall within the scope of the present invention, the above-named dental tools are illustrated in various of the dental supply catalogues as for example in the catalogue of Flawless Dental Products Company: Flame—1A, 2A, 3A and 4A; Torpedo—2E, 3E and 4E; Straight cylinder—1F and 2F; Tapered Cylinder—2D, 5D and 6D; Inverted Cone—½C and 4C. While all of these tools as shown in the catalogue are not perforated, it is an object of the present invention to adapt such rotary tools for the emission of coolant fluids on the surface thereof in a manner which will produce a smooth and uniform cutting or reduction of the tooth surface to which the tool has been applied.

Another object of the present invention is to provide a rotary dental tool which is adapted for the emission of fluid coolant and is balanced during high speed rotation for use in air turbine dental hand pieces.

Another object of the present invention is to provide a dental tool which is durable, easy to manipulate, suitable for cooling substantially the entire surface being worked upon and light weight for use in high speed dental equipment.

Another object of the present invention is to provide a rotary dental tool in which the cooling of the worked surface is more uniform and materials cut or abraded from the tooth surface are effectively removed from interfering with the further working of the tooth's surface.

The invention possesses other objects and features of advantage, some of which of the foregoing will be set forth in the following description of the preferred form of the invention which is illustrated in the drawing accompanying and forming part of the specification. It is to be understood, however, that variations in the showing made by said drawing and description may be adopted within the scope of the invention as set forth in the claims.

Referring to said drawings:

FIGURE 1 is a side elevational view of a rotary dental tool constructed in accordance with the present invention.

FIGURE 2 is a side elevational view in cross-section of the rotary dental tool.

FIGURE 3 is an enlarged lay-out view of the surface of the head of the rotary dental tool.

The rotary dental tool of the present invention comprises, briefly, a shank 11, an elongated tool head 12 provided on one end thereof and being of circular cross-section providing a peripheral work engaging area 13; the shank 11 being formed with a main coolant passageway 16 extending into the head 12 and the head 12 being formed with a plurality of passageways 17 extending from the main passageway 16 to the area 13 and terminating in discharge ports 18 thereat distributed over substantially the whole of the area 13 for discharge of coolant to the area; and the ports 18 being positioned so that each longitudinally adjacent port touches a common circumferential line and each circumferentially adjacent port touches a common longitudinal line on the area 13.

In order to obtain uniform cooling and smooth and uniform cutting of the tooth worked upon over the entire length of an elongated rotary dental tool, the distribution or arrangement of discharge ports 18 on the dental tool surface 13 has been designed so that over the entire length of the elongated dental tool, longitudinally adjacent ports touch a common circumferential line. As thus constructed, one revolution of the tool head will result in the entire length of the tooth engaged to be exposed to discharge coolant directly from the discharge ports 18.

Examining the port arrangements in more detail, see layout view of head, FIGURE 3, the ports are distributed over substantially the full length and breadth of the head. It will also be observed that any pair of longitudinally adjacent ports, as for example ports 21 and 22, will touch and preferably overlap a circumferential line 20 drawn perpendicularly to the axis 31 and intersecting the ports.

Similarly, ports 22 and 23 overlap a common circumferential line as do ports 23 and 24, 24 and 25, and 25 and 26, et cetera. This circumferential touching is continued down the length of the dental tool. A small amount of overlap is preferable in or to ensure smooth cutting and yet ease the problem of indexing the ports 18 to be exactly tangent to the circumferential line.

It has been found, that in order to completely eliminate striations or ridges produced by ports in the work engaging area of the drill, the ports should be positioned so that each pair of circumferentally adjacent ports touch a common longitudinal line. This longitudinal touching also may be seen in FIGURE 3 wherein a series of ports comprised of ports 21, 24, 36, 37 and 38 each overlap common longitudinal lines. That is, ports 21 and 24 are circumferentially adjacent and overlap a line 30 on a surface 13 parallel to the axis 31, and similarly, ports 24 and 36 overlap, ports 36 and 37 overlap and ports 37 and 38 overlap. Moreover, it will be seen that ports 38 and 25 are circumferentially adjacent and also overlap a common longitudinal line. As thus constructed, there is longitudinal touching or overlapping around the entire circumference of the drill head 12.

When the drill head 12 is constructed with coolant ports 18 positioned for longitudinal and circumferential overlapping over substantially the entire work engaging area 13, a smooth and uniform cutting or abrading of the tooth surface and a highly effective cooling thereof will be achieved without the need for any specialized or highly skilled manipulation of the dental tool in order to eliminate striations.

As a further feature of the present invention, the rotary dental tool is constructed for better dynamic balance as well as more uniform cutting and cooling. As here illustrated in FIGURE 3 the ports 18 are arranged in three series of helical paths extending longitudinally and circumferentially on the surface 13. One of these helical paths is defined by the ports 21, 24, 36, 37 and 38. Two other paths having substantially equal circumferential spacing are headed by the ports 22 and 23. It will, of course, be understood that the selection of hole diameter and the angle of pitch of the helical path on which these holes are arranged would allow the positioning of the ports 18 in other arrays while still maintaining dynamic balance. For example, depending upon the size of the tool and other factors mentioned, two paths or four paths when equally circumferentially spaced can be arranged for longitudinal and circumferential overlapping and still maintain dynamic balance.

It can further be seen that the plurality of longitudinally and circumferentially extending helical paths having substantially equal circumferential spacing are also preferably arranged so that longitudinally adjacent ports, such as those in the series of ports 21-26 lie on a helical path of relatively low pitch. This helical path of relatively low pitch extends continuously from one of the working areas 13 to the other.

As a further feature of the present invention, the pitch of the various spiral paths is preferentially oriented relative to the preferred direction of rotation of the dental hand piece. Most dental handpieces have a single preferred direction of rotatation which in most hand pieces is clockwise as one looks down from the shank 11 to the end or point 19 of the tool. It is a feature of the construction of the present invention that the pitch of each of the helical paths upon which the ports 18 lie advances toward the shank 11. As will be understood, such progression of the coolant openings over the tooth surface being worked will result in the emission of coolant fluid moving the abraded or cut-away tooth enamel to the progressively moved toward the shank 11 of the drill. Movement of the abraded tooth material toward the shank 11 and away from the area being worked upon helps to produce a more uniform cutting or abrading of the tooth surface.

The dental tool of the present invention can be constructed in a variety of manners, for example, see applicant's co-pending application Ser. No. 466,559 for Dental Drill and Method of Manufacture. Indexing and drilling of the ports on the head can be accomplished by standard production methods. Preferably, the application of suitable abrasive material such as diamonds will follow the drilling of the ports and passageways.

I claim:

1. A rotary dental tool comprising a shank, and an elongated tool head provided on one end of said shank, said head being of circular cross-section and having a peripheral work engaging area, said shank being formed with a main coolant passageway extending into said head, said head being formed with a plurality of passageways extending from said main passageway to said area and terminating in discharge ports thereat distributed over substantially the whole of said area for discharge of coolant to said area, said ports being positioned so that each longitudinally adjacent port touches a common circumferential line and each circumferentially adjacent port touches a common longitudinal line on said area.

2. A rotary dental tool as defined in claim 1, wherein said ports are arranged in a plurality of longitudinally and circumferentially extending helical paths having substantially equal circumferential spacing.

3. A rotary dental tool as defined in claim 2, wherein the longitudinally adjacent ports of said paths lie in a helical path of relatively low pitch.

4. A rotary dental tool as defined in claim 3, wherein said tool has a preferred direction of rotation for working on a tooth surface and the pitch of each of said paths advances toward said shank during said rotation.

References Cited
UNITED STATES PATENTS

| | | | |
|---|---|---|---|
| 2,912,887 | 11/1959 | Andreasson | 77—68 |
| 3,096,668 | 7/1963 | Maynard | 77—68 |
| 3,229,427 | 1/1966 | Goodhew | 77—68 |

FOREIGN PATENTS

| | | |
|---|---|---|
| 1,052,375 | 9/1953 | France. |

LOUIS G. MANCENE, *Primary Examiner.*

ROBERT PESHOCK, *Assistant Examiner.*